US012545564B2

(12) United States Patent
Cadou et al.

(10) Patent No.: US 12,545,564 B2
(45) Date of Patent: Feb. 10, 2026

(54) LOAD HANDLING MACHINE, MECHANICAL SHOVEL, BUCKET LOADER OR THE LIKE, AND METHOD FOR CONTROLLING A LOAD HANDLING MACHINE

(71) Applicant: MANITOU BF, Ancenis (FR)

(72) Inventors: Sylvain Cadou, Ancenis (FR); Philippe Lebreton, Ancenis (FR)

(73) Assignee: MANITOU BF, Ancenis (FR)

( * ) Notice: Subject to any disclaimer, the term of this patent is extended or adjusted under 35 U.S.C. 154(b) by 485 days.

(21) Appl. No.: 17/613,704

(22) PCT Filed: Jun. 2, 2020

(86) PCT No.: PCT/FR2020/050931
§ 371 (c)(1),
(2) Date: Nov. 23, 2021

(87) PCT Pub. No.: WO2020/245532
PCT Pub. Date: Dec. 10, 2020

(65) Prior Publication Data
US 2022/0227611 A1     Jul. 21, 2022

(30) Foreign Application Priority Data

Jun. 7, 2019  (FR) ..................................... 19 06109
Jun. 7, 2019  (FR) ..................................... 19 06110

(51) Int. Cl.
*B66F 17/00*      (2006.01)
*B60K 28/04*      (2006.01)
(Continued)

(52) U.S. Cl.
CPC .............. *B66F 9/065* (2013.01); *B60K 28/04* (2013.01); *B66F 9/0655* (2013.01);
(Continued)

(58) Field of Classification Search
CPC ...... B66F 9/065; B66F 9/0655; B66F 9/0759; B66F 9/0755; B66F 9/20; B66F 17/00; B66F 17/003; B60K 28/04
See application file for complete search history.

(56) References Cited

U.S. PATENT DOCUMENTS 5,109,945 A      5/1992  Koga
6,178,841 B1    1/2001  Ruckert et al.
(Continued)

FOREIGN PATENT DOCUMENTS

EP    1953027            8/2008
EP    1953027 A1  *  8/2008  ............. B60K 28/04
(Continued)

OTHER PUBLICATIONS

International Search Report dated Sep. 28, 2020.
CN Office Action dated Jul. 12, 2022.

*Primary Examiner* — Gonzalo Laguarda
(74) *Attorney, Agent, or Firm* — IPSILON USA, LLP

(57) ABSTRACT

The invention relates to a machine (1) for handling loads (24), comprising: —a frame (2) equipped with a driving station (15), —a load handling system (4) carried by the frame, a device (6) for controlling the load handling system (4), wherein this control device (6) that can be manually actuated by an operator comprises a manual part (61) configured to be manually grasped, —a control unit (5), the control unit (5) being configured to receive control signals from said control device (6), —a member (7) for activating the manually actuatable control device (6), wherein the control unit (5), in the actuated state of the activating member (7), is configured to authorize the control of the handling system (4) as a function of at least the control signals received from the control device (6), characterized in that the driving station (15) is equipped with a detection system (16) for detecting a presence or absence of the (Continued)

operator at said station (15), this detection system (16) comprising at least one presence sensor (17) distinct from the control device (6), and characterized in that the control unit (5), in the non-actuated state of the activating member (7) and after passing from the actuated state to the non-actuated state of the activating member (7), is configured to prevent or authorize the control at least of the handling system (4) with the control device (6) at least as a function of the absence or presence status of the operator detected by the system (16) for detecting a presence of the operator at said station (15).

14 Claims, 7 Drawing Sheets

(51) Int. Cl.
*B66F 9/065* (2006.01)
*B66F 9/075* (2006.01)
*B66F 9/20* (2006.01)

(52) U.S. Cl.
CPC ............ *B66F 9/0759* (2013.01); *B66F 17/00* (2013.01); *B66F 9/0755* (2013.01); *B66F 9/20* (2013.01); *B66F 17/003* (2013.01)

(56) References Cited

U.S. PATENT DOCUMENTS

| | | | |
|---|---|---|---|
| 6,609,357 B1 * | 8/2003 | Davis | A01D 34/006 701/25 |
| 7,044,705 B2 * | 5/2006 | Way | E02F 3/433 60/563 |
| 2020/0115194 A1 | 4/2020 | Cadou | |

FOREIGN PATENT DOCUMENTS

| | | |
|---|---|---|
| JP | 2005076321 | 3/2005 |
| WO | 2019039522 | 9/2020 |

* cited by examiner

LOAD HANDLING MACHINE, MECHANICAL SHOVEL, BUCKET LOADER OR THE LIKE, AND METHOD FOR CONTROLLING A LOAD HANDLING MACHINE

RELATED APPLICATION

This application is a National Phase of PCT/FR2020/050931 filed on Jun. 2, 2020, which claims the benefit of priority from French Patent Application Nos. 19 06110 and 19 06109, both filed on Jun. 7, 2019, the entirety of which are incorporated by reference.

FIELD OF THE INVENTION

The present invention relates to a load-handling machine, such as a machine with a telescopic or non-telescopic lifting arm, a power shovel, a bucket loading machine or the like, and to a method for controlling a load-handling machine.

It relates more particularly to a load-handling machine comprising:
  a wheeled chassis equipped with a driver station,
  a drive system driving the movement of the wheeled chassis,
  a system for handling a load and borne by the chassis,
  a control device for controlling the load-handling system, this control device, which can be manually actuated by an operator, comprising a manual part configured to be grabbed manually,
  an operating unit, the operating unit being configured to receive control signals from said control device,
an activation member for the manually actuatable control device, an operating unit, the operating unit being configured so that, when the activation member is in the actuated state, said unit allows the handling system to be operated as a function at least of the control signals received from the control device.

DESCRIPTION OF RELATED ART

For safety reasons, the regulations dictate that measures be put in place to prevent accidental operation of the control device on load-handling machines. By way of example, accidental operation could be caused by the operator's clothing becoming caught on the control device so that the operator operates it unintentionally or without realizing. In order to address this problem, load-handling machines comprising an activation member activating the control device in order to avoid accidental operation using the control device have been developed, as illustrated in patents EP-0.981.078 and EP-1.523.704. This is also the case with document EP-1.953.027. However, the presence of such an activation member places restrictions on the operator. Solutions are therefore sought that allow the restrictions imposed on the operator to be reduced without harming the safety of the operator.

OBJECTS AND SUMMARY

It is an object of the invention to propose a load-handling machine of the aforementioned type the design of which makes it possible to reduce the restrictions imposed on the operator without harming the safety of the operator.

To this end, one subject of the invention is a load-handling machine comprising:
  a chassis equipped with a driver station,
  a system for handling a load and borne by the chassis, a control device for controlling the load-handling system, this control device, which can be manually actuated by an operator, comprising a manual part configured to be grabbed manually,
  an operating unit, the operating unit being configured to receive control signals from said control device,
  an activation member for activating the manually actuatable control device, the operating unit being configured so as, in the actuated state of the activation member, to allow the handling system to be operated as a function at least of the control signals received from the control device,
characterized in that the driver station is equipped with a detection system enabling detection of the presence or absence of the operator at said station, this detection system comprising at least a presence sensor distinct from the control device, and in that the operating unit is configured so that, when the activation member is in the non-actuated state after the activation member has passed from the actuated state to the non-actuated state, said unit prevents or allows at least the handling system to be operated using the control device at least as a function of the status, operator-absent or operator-present, detected by the detection system for detecting the presence of the operator at said station. The presence of such a system for detecting the absence or presence of the operator makes it possible for example to extend the period during which the activation member can remain in the non-actuated state without harming the safety of the operator.

According to one embodiment of the invention, the handling machine comprises a sensor sensing a parameter indicative of a movement of the machine, and the operating unit is configured to allow the handling system to be operated using the control device as a function of at least the parameter indicative of a movement of the machine. Again, this arrangement makes it possible to limit the restrictions placed on the operator with regard to the activation member and to improve the driving comfort during the drive-along phases of the machine without harming the safety of the operator.

According to one embodiment of the invention, the sensor of a parameter indicative of a movement of the machine is a sensor of a parameter indicative of the speed of travel of the machine, in that the machine comprises a memory for storing a predetermined speed of travel of the machine, and in that the operating unit is configured so that, when the activation member for activating the control device is in the non-actuated state, said operating unit allows the handling system to be operated using the control device when the speed of travel of the machine as supplied by the sensor of a parameter indicative of the speed of travel of the machine is greater than the predetermined value stored in memory.

According to one embodiment of the invention, the operating unit is configured to start at least one timer referred to as the presence timer defining a time interval when the activation member passes from the actuated state to the non-actuated state, and to prevent the handling system from being operated using the control signals provided by the control device to the operating unit when the time interval defined by the presence timer has elapsed, and the operating unit is configured to reset the presence timer as a function of at least the status, operator-absent or operator-present, detected by the detection system for detecting the presence of the operator at said station.

According to one embodiment of the invention, the operating unit is configured to prevent a resetting of the presence timer when the detection system for detecting the presence of the operator at said station detects the absence of the operator.

According to one embodiment of the invention, the operating unit is configured to reset the presence timer as a function at least of the control signals received from the control device.

According to one embodiment of the invention, the operating unit is configured to reset the presence timer as a function of the data provided by the sensor of a parameter indicative of a movement of the machine.

According to one embodiment of the invention, the operating unit is configured to start at least one timer referred to as the control timer defining a time interval when the activation member passes from the actuated state to the non-actuated state, and to prevent the handling system from being operated using the control device when the time interval defined by the control timer has elapsed, and in that the operating unit is configured to reset the control timer as a function of at least the data supplied by the sensor of a parameter indicative of a movement of the machine and, where appropriate, as a function of at least the control signals received from the control device.

According to one embodiment of the invention, the time interval defined by the control timer is of a duration greater than the time interval defined by the presence timer. It is thus possible in the presence of the operator to offer improved driving comfort without harming the safety of the operator.

According to one embodiment of the invention, the control device that controls the handling system is a control device comprising at least two control elements.

According to one embodiment of the invention, the machine comprises a drive system driving the movement of the wheeled chassis, in that the control device for controlling the handling system is a multifunction control device, and in that at least one of the control elements is configured to control at least part of the handling system, and in that the other control element or another of the control elements is configured to control at least part of the drive system driving the movement of the machine.

According to one embodiment of the invention, the activation member is borne by the control device for controlling the handling system.

According to one embodiment of the invention, the activation member is a sensor for detecting the presence of an operator's hand on the manual part of the control device.

According to one embodiment of the invention, the handling system comprises at least one handling arm mounted on said chassis rotatable about a horizontal axis of rotation and at least one actuator driving said handling arm in its movement about said horizontal axis of rotation.

According to one embodiment of the invention, the driver station takes the form of an operator cab inside which there is at least one seat on which the operator can sit, said operator cab being closed by a door, and in that the or at least one of the presence sensors of the detection system for detecting the presence of an operator at said station equips the seat.

According to one embodiment of the invention, the system for detecting the presence of an operator at said station comprises at least a sensor for detecting the opening and/or the closing of the door.

A further subject of the invention is a method for controlling a load-handling machine comprising:
a chassis equipped with a driver station,
a system for handling a load and borne by the chassis, a control device for controlling the load-handling system, this control device, which can be manually actuated by an operator, comprising a manual part configured to be grabbed manually,
an operating unit, the operating unit being configured to receive control signals from said control device,
an activation member for activating the manually actuatable control device, said method comprising a step of manually actuating the activation member for activating the control device so as, in the actuated state of the activation member, to allow the handling system to be operated as a function at least of the control signals received from the control device,
characterized in that the driver station being equipped with a detection system enabling detection of the presence or absence of the operator at said station, this detection system comprising at least a presence sensor distinct from the control device, the method comprises, when the activation member is in the non-actuated state after the activation member has passed from the actuated state to the non-actuated state, a step of allowing or preventing the handling system to be operated or from being operated using the control device, at least as a function of the status, operator-absent or operator-present, detected by the detection system for detecting the presence of the operator at said station.

BRIEF DESCRIPTION OF THE DRAWINGS

The invention will be clearly understood upon reading the following description of exemplary embodiments, with reference to the appended drawings in which.

DETAILED DESCRIPTION

Figure 1:
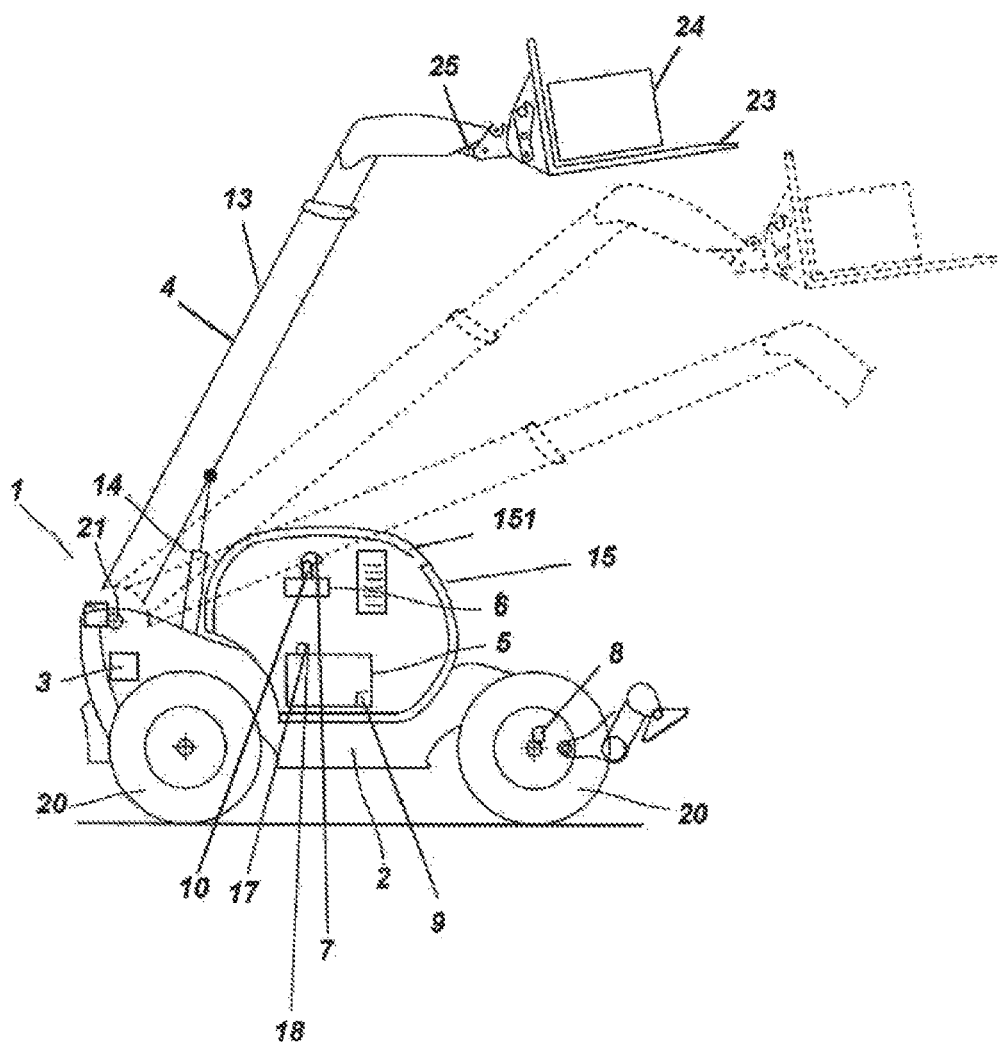
FIG. 1 depicts a schematic view of a load-handling machine according to the invention, with the lifting arm in the raised position.
Figure 2:
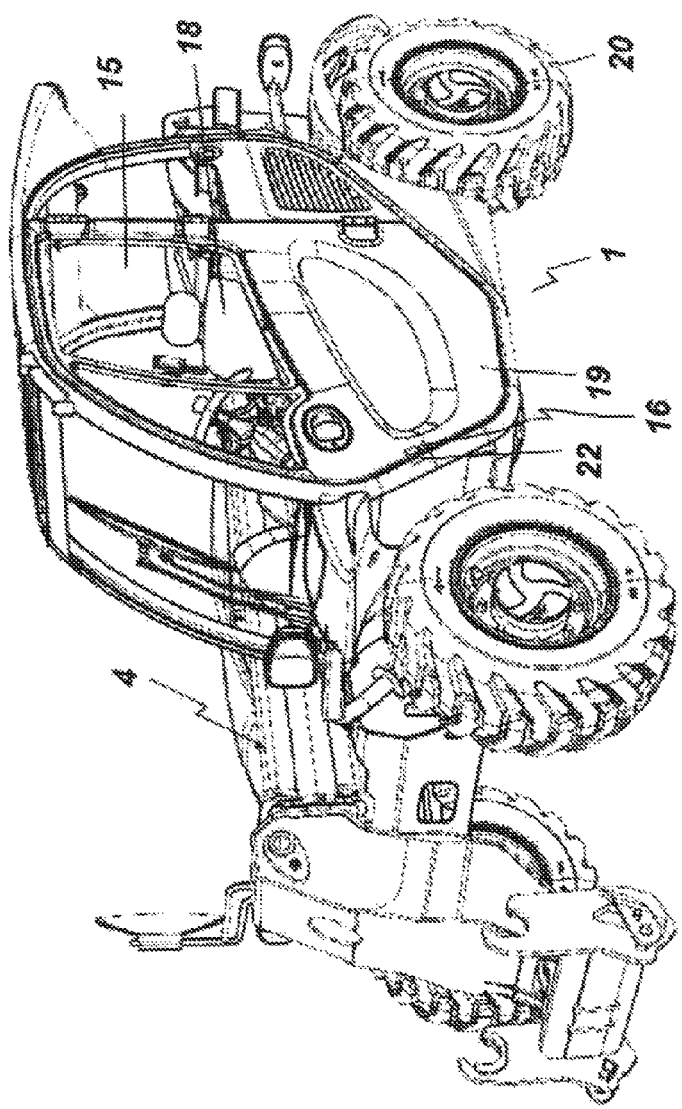
FIG. 2 depicts a perspective view of a load-handling machine according to the invention, with the lifting arm in the lowered position.

The concept of the invention is described in more detail below with reference to the appended drawings, which show embodiments of the concept of the invention. Reference throughout the specification to "an/one embodiment" means that a particular functionality, structure or feature described in connection with an embodiment is included in at least one embodiment of the present invention. Thus, the occurrence of the expression "in one embodiment" in various places throughout the specification does not necessarily refer to the one same embodiment. Furthermore, the particular functionalities, structures or features may be combined in any suitable manner in one or more embodiments.

As mentioned hereinabove, the invention relates to a load-handling machine 1 according to that depicted in FIG. 1. This machine 1 comprises a chassis 2. In the example depicted, this chassis 2 is equipped with wheels 20 for bearing on the ground so as to form a wheeled chassis 2. This chassis 2 is surmounted by a driver station 15. The driver station 15 takes the form of an operator cab 151 inside which there is at least one seat 18 on which the operator can sit. The operator cab 151 is closed by a door 19. The machine 1 may further comprise, as in the example depicted, a drive system 3 driving the movement of the wheeled chassis 2 by driving a rotational movement of the wheels 20 of the machine 1. This drive system 3 driving the chassis 2 comprises, in a way known per se, a combustion engine connected to the wheels 20 by a transmission. This drive system 3 driving the movement of the chassis 2 is controlled notably using a throttle pedal, not depicted, positioned in the operator cab 151.

The handling machine 1 further comprises a system 4 for handling a load and borne by the chassis 2. This handling system 4 comprises at least one handling arm 13 mounted on said chassis 2 rotatable about a horizontal axis 21 of rotation and at least one actuator 14 driving said handling arm 13 in its movement about the horizontal axis 21 of rotation. The handling arm 13 is therefore a pivoting arm mounted with the ability to pivot about the horizontal axis 21, orthogonal to the longitudinal axis of the arm, so that the arm 13 can be moved from a lowered position to a raised position and vice versa using the actuator 14, such as a hydraulic ram connected to a hydraulic pump by a hydraulic circuit, the pump and the circuit not being depicted. The arm may be a telescopic arm the length of which can be adjusted between a retracted position and a deployed position of the arm. To this end, the arm 13 may be formed of two arm sections of which one, referred to as the first section, is coupled, with the ability to pivot, to the chassis 10 and of which the other, referred to as the second section, is nested in the first arm section with the ability to slide therein. As an alternative, it is possible for the arm not to be telescopic.

The nested sliding relative movement of the two arm sections can be obtained using a second actuator of the machine, such as a double-acting ram, housed in the first arm section and fixed by its rod to the second arm section to allow the arm sections to be driven in relative motion under the effect of the retraction or deployment of the ram rod.

The load-handling arm 13 may be equipped, at its free end, with an accessory 23 connected to the arm by a pivoting connection. This accessory 23 may be driven about the pivot of the pivoting connection by an actuator 25 which may once again be formed by a double-acting hydraulic ram or by two single-acting rams in parallel and operated in turn.

In the example depicted, this accessory 23 comprises a fork fitting and the actuator 25 allows the fork fitting to be made to move between a pick-up position and a discharge position through the pivoting of the accessory about an axis referred to as horizontal, orthogonal to the longitudinal axis of the arm 13. This pivot axis is parallel to the pivot axis 21 about which the arm 13 is connected to the chassis 10. The discharge position corresponds to the most groundwardly-pivoted position of the fork fitting. The pick-up position of the fork fitting corresponds to an upwardly-pivoted position of the fork fitting and of the associated load 24 when such a load is present.

The handling machine 1 further comprises an operating unit 5 configured to control the operation of the actuators 14 and 25 and, where appropriate, the deployment of the telescope when there is one, making it possible to bring about the movement of the arm 13 and of the accessory 23.

The operating unit 5 is an electronic and/or computerized unit which, for example, comprises a microcontroller or a microprocessor associated with a memory. Thus, when it is stated that the unit or means belonging to said unit are configured so as to perform a given operation, this means that the unit comprises computer instructions and the corresponding execution means that make it possible to perform said operation and/or corresponding electronic components.

In other words, the functions and steps described may be implemented in the form of a computer program or via hardware components (for example programmable gate arrays). In particular, the functions and steps carried out by the operating unit 5 may be performed by sets of instructions or computer modules implemented in a processor or controller or be performed by dedicated electronic components or FPGA or ASIC components. It is also possible to combine computer parts and electronic parts.

The operating unit 5 therefore controls the handling system 4 and, in particular, the movements of the arm 13 and of the accessory 23 by controlling the corresponding actuators 14 and 25 via the hydraulic circuit.

The control signals supplied by the operating unit 5 generally act on members, such as distributors or valves, placed in the connection between the pump and the actuators 14, 25 so as to allow appropriate supply of fluid to the actuators 14, 25, in a way known per se.

The handling machine 1 further comprises a control device 6 for controlling the load-handling system 4. This control device 6 is manually actuated and is able to supply control signals to the operating unit 5. These control signals are processed by the operating unit 5. From these control signals, the operating unit 5 generates control signals for controlling at least the load-handling system 4 as described hereinabove.

In the examples depicted, the control device 6 for controlling the load-handling system 4 is a multifunction control device 6. Specifically, the control device 6 can be used for controlling, on the one hand, the handling system 4 and, on the other hand, the system 3 that drives the movement of the machine 1. In a variant, the control device 6 could have been a control device allowing control only of the handling system 4. In what follows, it will always be considered that the control device 6 is a multifunction control device. Thus, this control device 6 for controlling the handling system 4 comprises at least two control elements. In the examples depicted, one of the control elements, depicted as 10 in the figures, is configured to control at least part 4 of the handling system, and another control element, depicted as 11 in the figures, is configured to control at least part of the system 3 driving the movement of the machine 1. Other control elements, depicted as 12a and 12b in the figures, are also present. This control device 6 may adopt a wide variety of forms.

Figure 3:
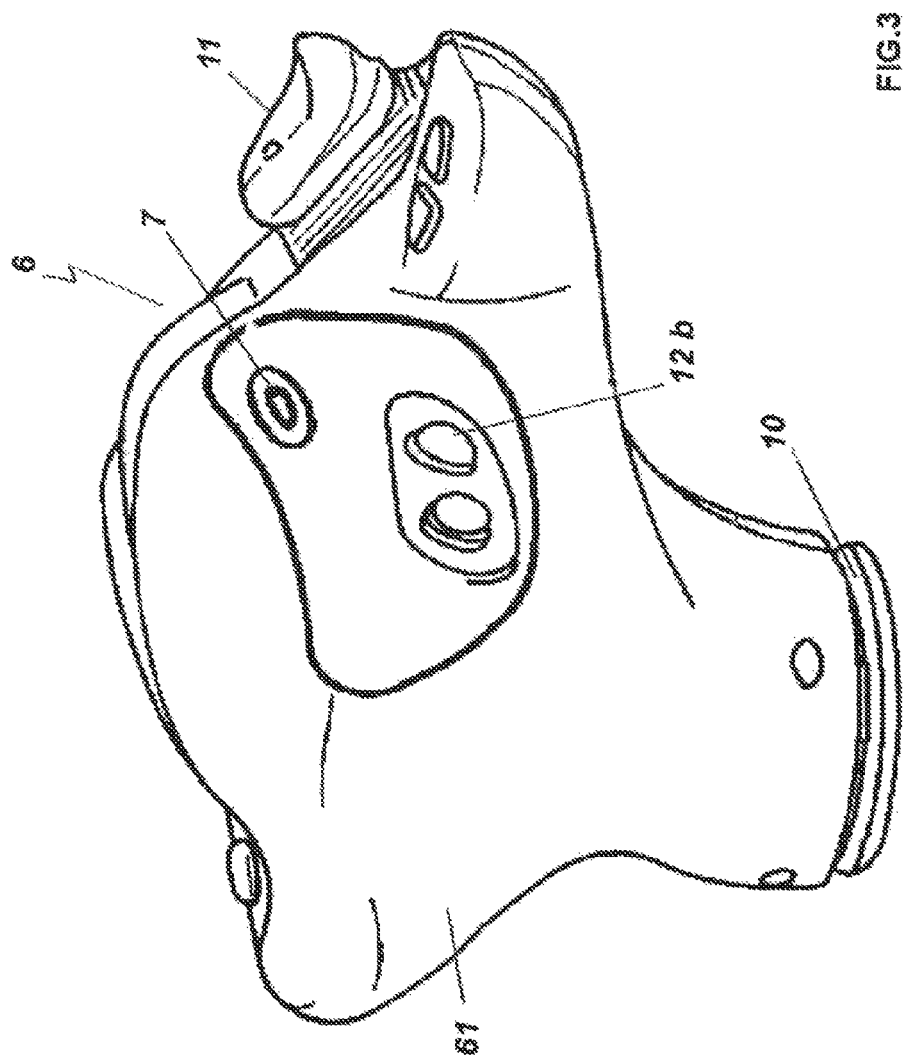
FIG. 3 depicts a partial view of a control device viewed from the activation-member side.
Figure 4:
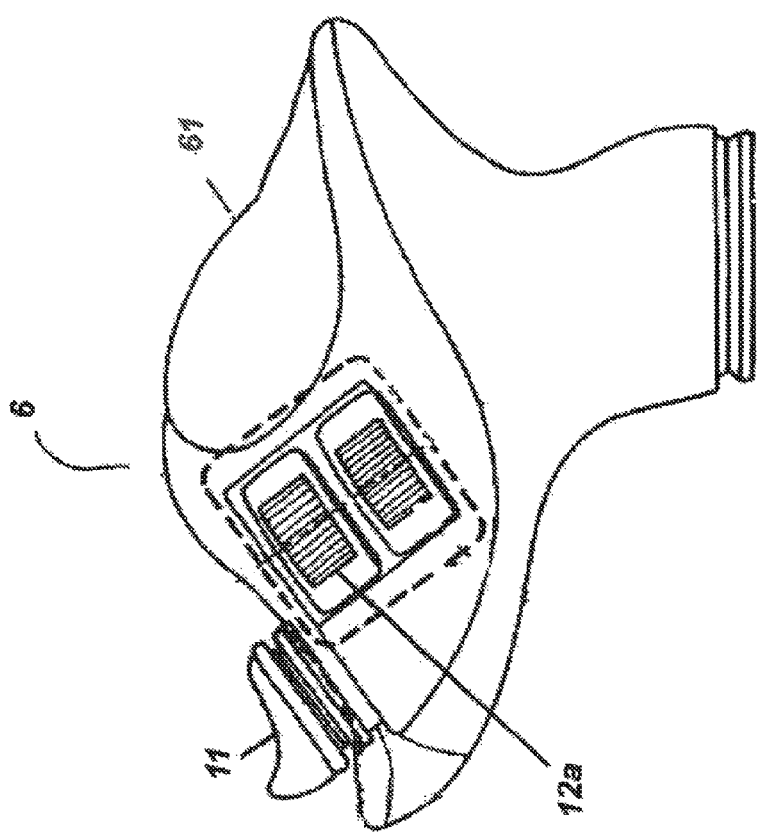
FIG. 4 depicts a partial view of a control device viewed from the opposite side to the activation-member side.
Figure 5:
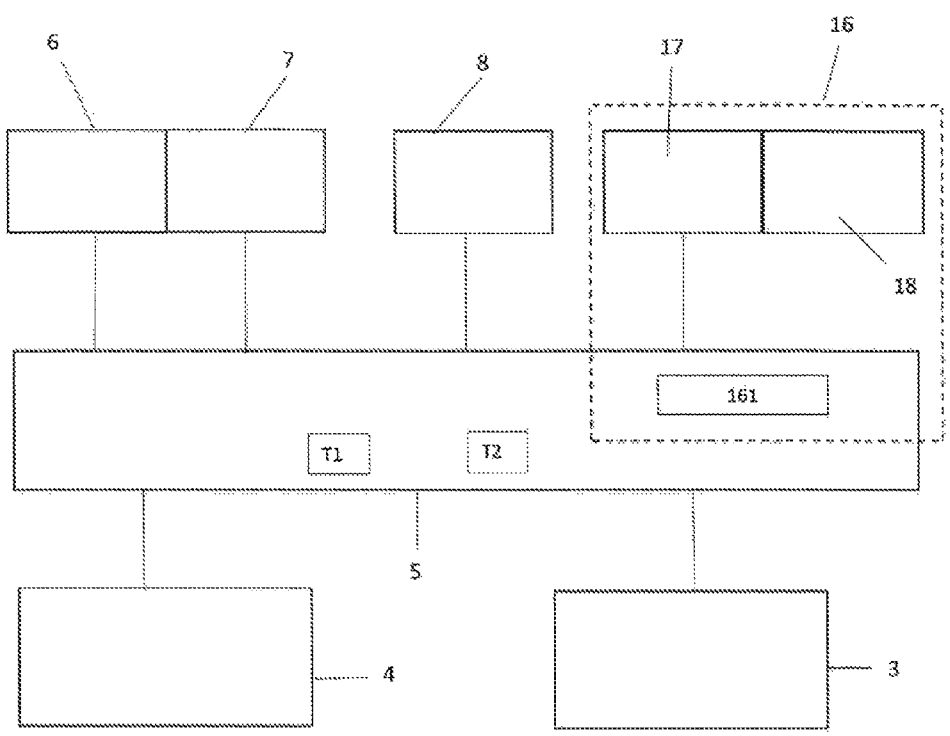
FIG. 5 is a schematic depiction of components of the machine.

In the example depicted in FIGS. 1, 3 and 4, the control element 10 of the control device 6 for controlling the handling system 4 is a lever or joystick that the operator of the machine can manipulate by hand, and the other control elements 11, 12a, 12b are borne by said lever. These other control elements are located on the pommel of the lever. This lever pommel corresponds to the manual part 61 of the control device 6 and is configured to be grasped when the control device is being grasped in the hand in accordance with its purpose.

Such a control device is well known to those skilled in the art and an example of such a control device is described for example in patent FR-2.858.861.

The control lever or joystick transmits position signals from said lever to the operating unit 5 in a way known per se. These position signals may be interpreted by the operating unit 5 as signals for instructing the movement of the arm 13 and/or the accessory 23.

According to one embodiment, the control lever may thus be moved forward toward the front, backward toward the rear, or toward the left or toward the right of the machine. In the example depicted, this control lever able to move at least in the forward/backward direction toward the front/rear of the machine is mounted with the ability to move forward, to control the lowering of the arm 13, and backward, to control the raising of the arm 13. The forward/backward movement of the control lever may thus control the operation of the first actuator 14 between arm 13 and chassis 2. This control lever 10 may further be mounted with the ability to move in the left/right direction, transverse to the forward/backward direction, to the left in order to command the pick-up position, and to the right to command the discharge position of the accessory 23. The left/right movement of the control lever thus controls the operation of the actuator 25 between accessory 23 and arm 13. These forward/backward and left/right directions correspond to the main directions and the control lever may be driven in an infinite number of directions, the moving of the control lever in a given direction corresponding to a combined action proportionate to the position of the control lever with respect to the main directions. As illustrated in FIG. 4, the control lever may be equipped with a control element 12a, such as a knob, for controlling the telescoping actuator in order to telescope out in the case of a telescopic arm 13. Thus, the rotating of the knob borne by the control lever in one direction allows the arm 13 to be deployed through a sliding movement in the direction of an extension of the arm 13 of the second arm section, and the rotating of the knob borne by the lever in an opposite direction allows the arm to be retracted.

Other buttons, knobs or the like, such as the one depicted as 12b in FIG. 3, may be provided for controlling certain functions of the accessory. One of the control elements, which has been depicted as 11 in the figures, is configured to control at least part of the system 3 that drives the movement of the machine. This control element 11 may be formed of a reversing button with three stable positions, in order to cause the machine to operate in forward running, to stop in a neutral position, or to operate in reverse running. The transmission of the system 3 driving the movement of the chassis 2 may comprise a gearbox and the gearbox upshift and downshift control may be performed using a push-button or some other control member borne by the lever. It will be appreciated that these control elements may therefore, non-limitingly, be realized in the form of a knob, a switch, a button, a changeover switch, a sensor, notably a Hall-effect sensor, a potentiometer, or the like.

The lever and the control elements borne by the lever can be actuated by the operator with just one hand when that hand of the operator is positioned on the manual part 61 of the control device 6 here formed by at least part of the pommel of the control lever.

The handling machine 1 further comprises an actuating member 7 for actuating the manually actuatable control device 6. This activation member 7 is borne by the control device 6 for controlling the handling system 4.

The activation member 7 is a presence sensor able to detect the presence of an operator's hand on said control device 6 in the state in which the control device 6 has been grasped by a hand in accordance with its purpose. In particular, the activation member 7 is a presence sensor arranged on the manual part 61 of the control device 6. This activation member 7, which is manually actuated, is therefore configured to pass from the non-actuated state to the actuated state when a hand is present on the manual part 61 of the control device 6 and, conversely, from the actuated state to the non-actuated state in the absence of a hand on the manual part 61 of the control device 6. It should be noted that the term "actuated" should be understood in its broadest sense. Actuating the activation member 7 means acting upon the activation member 7. Actuation of the activation member 7 may therefore, non-limitingly, occur through simple contact, by resting or by pressure, through the presence of a hand at a distance closer than a predetermined distance, or the like, without departing from the scope of the invention.

The activation member 7 may, by way of example, be produced in the form of a button of the push-button type or of a sensor of the capacitive sensor type. The presence of the hand facing the activation member 7, including contactless presence, may be enough to actuate the activation member 7 in the case of a capacitive-type sensor.

The role of this activation member 7 that activates the control device 6 will be described hereinafter.

The handling machine 1 may further comprise a sensor 8 of a parameter indicative of a movement of the machine. The operating unit 5 is configured to receive the data supplied by this sensor 8. The operating unit is configured to allow the handling system to be operated using the control device as a function of at least the data supplied by this sensor 8. This sensor 8 may adopt a wide variety of forms. As a preference, this sensor 8 of a parameter indicative of a movement of the machine 1 is a sensor of a parameter indicative of the speed of travel of the machine 1 and the operating unit, configured to allow the handling system to be operated using the control device as a function of at least the parameter indicative of a movement of the machine, is configured to allow the handling system to be operated using the control device as a function of at least the parameter indicative of the speed of travel of the machine. This speed sensor 8 may be a sensor that measures the rotational speed of the wheels or the speed of any other mechanical member indicative of the speed of travel of the machine. A non-zero speed may also be detected by detecting the driving of a transmission component engaged with the wheels.

Finally, the machine 1 comprises, at the driver station 15, a system 16 for detecting the presence of the operator at the driver station. This detection system 16, which is able to detect the absence or presence of the operator at said station, comprises at least one presence sensor 17. This presence sensor 17 is distinct from the manual part 61 of the control device 6. The operating unit 5 is configured so that, when the activation member 7 is in the non-actuated state, the non-actuated state of the activation member 7 resulting from the activation member passing from the actuated state to the non-actuated state, said unit prevents or allows at least the handling system 4 to be operated using the control device 6 at least as a function of the status, operator-absent or operator-present, detected by the detection system 16 for detecting the presence of the operator at said station 15.

In the examples depicted, the presence sensor 17 of the detection system 16 is a sensor with which the operator seat 18 is equipped and which is sensitive to the pressure of the weight exerted by the operator on the squab of the seat. This sensor is in the active state and emits a signal when the operator is seated on the seat. The detection system 16 may further comprise a sensor 22 that detects the opening/closing of the door 19 of the cab 151. This sensor is in the active state and emits a signal when the door is in the closed state. The detection system 16 further comprises a processing module 161 allowing the processing of the signals from said sensors 17 and 22 in order to detect the presence or absence of the operator. This processing module 161 may be incorporated into the operating unit 5. The operating unit 5 is configured so that, when the activation member 7 is in the non-actuated state after the activation member 7 has passed from the actuated state to the non-actuated state, said unit prevents the handling system 4 from being operated using the control device 6 when the absence of the operator is detected, as explained hereinbelow. It should be noted that the presence of an operator is detected by the detection system 16 when the presence sensor 17 situated in the seat 18 is active or, when, with the door having been detected as being in the closed state by the sensor 22 that detects the opening/closing of the door 19, the presence sensor 17 situated in the seat is in the inactive state and has passed from the active state to the inactive state with the door in the closed state without an opening of the door being detected. The signals from these sensors are sent to the processing module 161.

As explained hereinafter, the operating unit 5 is configured to allow or prevent the operation of the machine, particularly of the handling system 4 and, where appropriate, of the system 3 for driving the movement of the wheeled chassis, from the control device 6.

The operating unit 5 is configured to receive signals from the activation member 7 when the activation member 7 is in the actuated state. Thus, in instances in which the activation member 7 is a push-button, a signal of actuation of the activation member 7 is supplied to the operating unit 5 when the operator's hand, placed on the control system 6, depresses the push-button.

In the case of an activation member 7 formed by a capacitive sensor, a signal is supplied to the operating unit 5 simply by the operator's hand being positioned on the control device 6 facing said sensor.

When the activation member 7 is in the actuated state, control of the handling system 4 and, where appropriate, of at least part of the drive system 3 driving movement is allowed as a function of at least the control signals received from the control device 6, these control signals being the result of operator actuation of the control device 6 as described hereinabove.

By virtue of the presence of the detection system 16, the disabling of the control notably of the handling system 4 from the control device 6 can occur in a highly responsive manner when the status, operator-absent, is detected. In particular, the operating unit 5 is configured to start at least a timer referred to as the presence timer T2 defining a time interval when the activation member 7 passes from the actuated state to the non-actuated state, and to prevent the handling system 4 from being operated using the control device 6 when the time interval defined by the presence timer T2 has elapsed. The operating unit 5 is configured to reset the presence timer T2 as a function of at least the signals supplied by the detection system 16 for detecting the presence of the operator at said station 19.

In practice, the operating unit 5 is configured to prevent the presence timer T2 from being reset as long as the absence of the operator from the driver station 19 is being detected. This absence of the operator may correspond:
either to an absence of a signal from the presence-detection sensor 17 with which the seat 18 of the driver station 15 is equipped when the door 19 of the operator cab 151 is in the open state
or, when the door 19 is in the closed state, to an absence of signal from the presence-detection sensor 17 with which the seat 18 of the driver station 15 is equipped, the absence of a signal from the presence-detection sensor 17 having begun when the door was in the open state.

The machine 1 comprises at least one timer T1, referred to as the control timer, defining a time interval which may be predefined or adjustable. This control timer T1 is, like the presence timer T2, in the conventional way, performed by a clock, and the time is counted incrementally or decrementally until the time interval defined by the timer T1 or, respectively, T2 has elapsed. Said clock is preferably incorporated into the operating unit 5. This control timer T1 starts when the activation member 7 passes from the actuated state to the non-actuated state, namely when the push-button is released or the hand is removed from a position facing the capacitive sensor. The operating unit 5 prevents the handling system 4 and possibly at least part of the system 3 driving the movement of the chassis 2 from being operated using the control device 6, namely from or by means of the control device 6 when the time interval defined by the control timer T1 has elapsed.

In order to prevent such a disabling when the machine 1 is in a driving-along phase, the operating unit 5 is configured so that, while the time interval defined by the control timer T1 is elapsing, the control timer T1 can be reset, namely can resume its count or, respectively, its countdown of the time interval defined by the control timer T1, as a function of at least data supplied by the sensor 8 that senses the speed of travel of the machine 1.

In particular, the machine 1 comprises a memory 9 for storing a predetermined speed of travel of the machine 1, and the operating unit 5 is configured to reset the timer T1 when the speed of travel of the machine 1, as supplied by the sensor 8 that senses the speed of travel of the machine, is greater than the predetermined speed stored in memory.

Thus, by way of example, the operating unit 5 is configured to reset the timer T1 when the speed of the machine is for example greater than 1 km/h.

In the same way, to prevent such a disabling of control, when the control device 6 is actuated by the operator, the operating unit 5 is also configured to reset the control timer T1 as a function of at least the control signals received from the control device 6.

Thus, after the activation member 7 has passed from the actuated state to the non-actuated state, as long as the control device 6 is actuated, namely as long as the lever or any one of the control elements borne by the lever are actuated within the time interval defined by the control timer T1, control from the control device 6 remains possible. This control, from the control device 6, ceases as soon as the control device 6 has remained non-actuated for a duration longer than the time interval predefined by the timer T1 while at the same time the speed of travel of the machine is below a predetermined speed. A further actuation of the activation member 7 is needed in order to restore the possibility of this control from the control device 6.

It should be noted that the presence timer T2 defines a time interval of duration shorter than the time interval of the control timer T1 so as to disable as quickly as possible control from the control device 6 when operator absence is detected. In the event that the presence of the operator is detected, this presence timer T2 is reset if the control device 6 is actuated within the time interval defined by the presence timer T2 or if the speed of travel of the machine is greater than a predetermined speed. Otherwise, the presence timer T2 is not reset.

Figure 6:
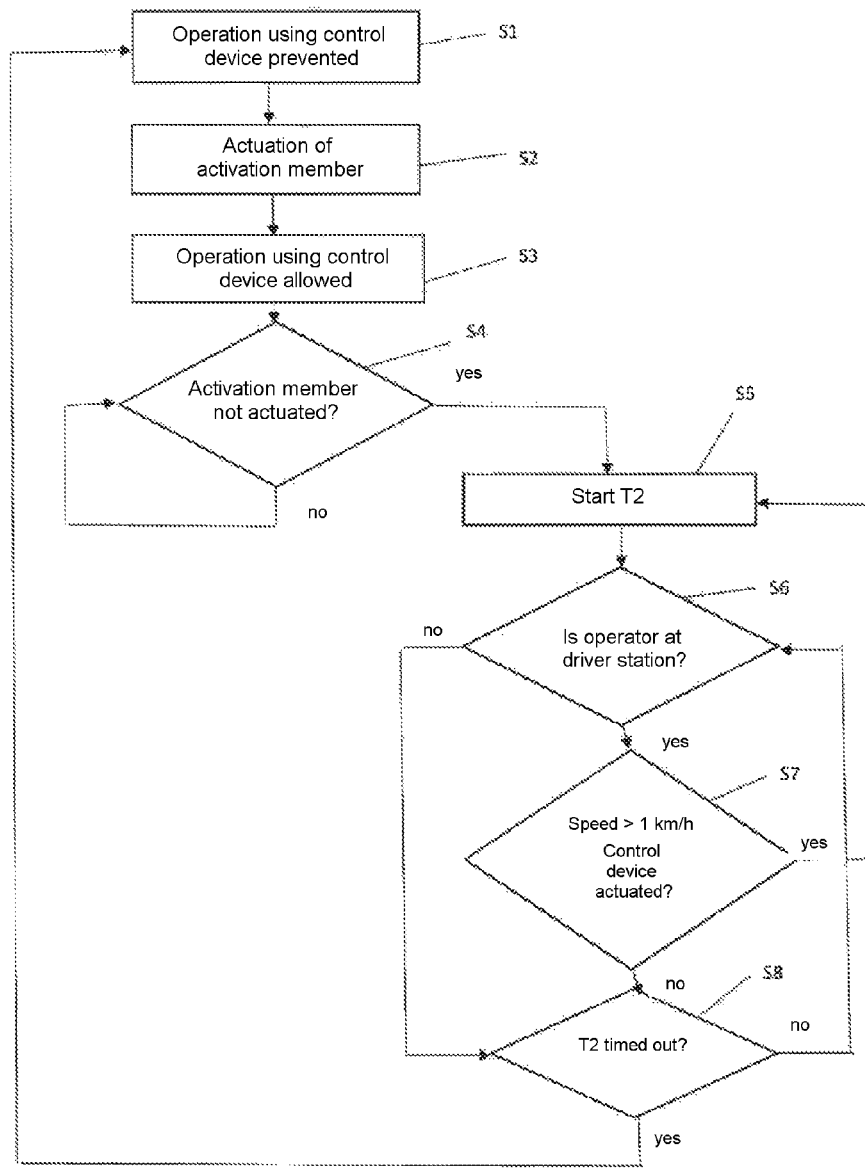
FIG. 6 is a schematic depiction of a control method that can be implemented by the handling machine of FIG. 1.
Figure 7:
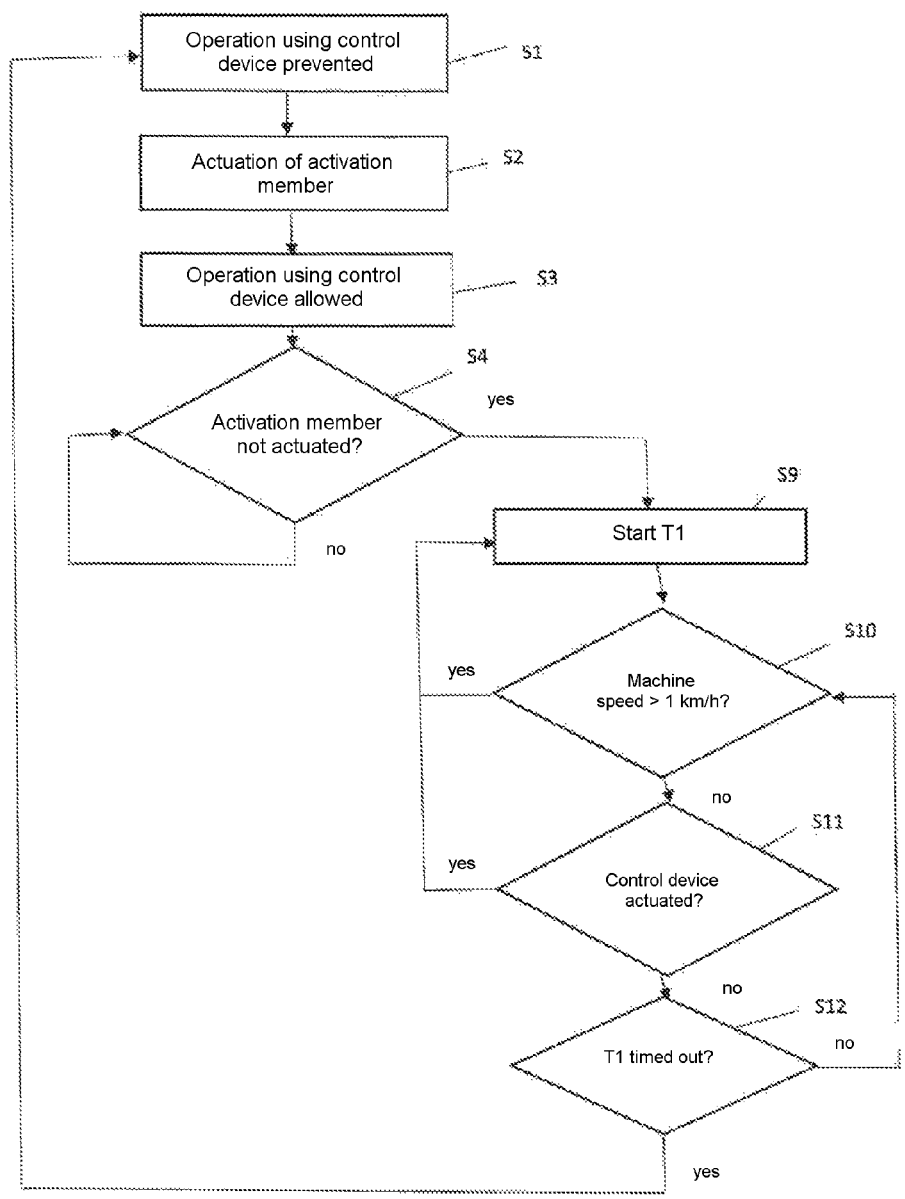
FIG. 7 is a schematic depiction of a control method that can be implemented by the handling device of FIG. 1.

Example of Control Method:

The control unit may be configured to implement a method for controlling the machine, as depicted in FIGS. 6 and 7. As explained hereinafter, the control method serves to allow or prevent the control of the handling system 4 and, where appropriate, of at least part of the system 3 driving the movement of the machine from the control device 6 notably on the basis of the presence of the operator at the driver station. According to one particular aspect, the method is executed in real time. In what follows, it is considered that the control device 6 is able to generate signals for controlling both the handling system 4 and at least part of the drive system 3 that drives the movement of the machine. As a variant, the control device 6 could have been capable only of generating signals for controlling the handling system 4, without departing from the scope of the invention.

In step S1, the activation member 7 is not actuated and control of the handling system 4 and of at least part of the movement-drive system 3 from the control device 6 is prevented.

In step S2, the activation member 7 is actuated by depressing the push-button or by positioning the hand facing the capacitive sensor. It therefore supplies an actuation signal to the operating unit 5.

In step S3, the operating unit on the basis of this actuation signal allows control of the handling system 4 and of at least part of the drive system 3 on the basis of the control signals supplied by the control device 6.

In step S4, the control method tests whether the activation member 7 is in the non-actuated state, namely whether a signal of non-actuation of the activation member 7 is being supplied by the activation member 7. The control method loops back on this step S4 until the activation member 7 becomes non-actuated.

In the non-actuated state of the activation member 7, the control method moves on to step S5 where the timer T2 defining a time interval of, for example, 5 seconds begins. The 5-second deadline begins its count and the control method moves on to step S6.

In step S6, the detection system 16, as a function of the signals supplied by the sensor 17 for sensing the presence of the operator at the station 15, and in particular on the seat 18 of the driver station 15, and possibly of the signals supplied by the sensor 22 that detects the opening/closing of the door 19 and of the processing of said signals, detects the presence or absence of an operator at the driver station 15.

When the detection system 16 comprises a presence sensor 17, an absence of the operator from the driver station is detected for example if no signal is supplied by the presence sensor 17. When the detection system 16 comprises a presence sensor 17, and a sensor 22 detecting the opening/closing of the door, an absence of the operator from the driver station is detected for example if no signal is supplied by the presence sensor 17 and if the door is detected as being open. The control method then moves on to a step S13 which checks whether the time interval defined by the presence timer T2 has elapsed. The control method tests by looping back through steps S11 and S13 as long as the time interval of the presence timer T2 has not elapsed. If the time interval defined by the presence timer T2 has elapsed, then the control method returns to step S1.

If, conversely, in step S6, the detection system 16, as a function of the signals supplied by the sensor 17 for detecting the presence of the operator at the driver station 15, and by the sensor 22 that detects the opening/closing of the door and the processing of said signals, detects the presence of an operator at the driver station, for example if a presence signal is supplied by the presence sensor 17, then the control method moves on to step S7.

In step S7, the speed of the machine is compared against a threshold speed value stored in memory and generally equal to 1 km/h. If the speed is greater than the threshold speed, then the control method returns to step S5 to start the presence timer T2 again, which corresponds to a resetting of the timer T2. The 5-second deadline therefore begins its count again. In this same step S7, if the speed is below the threshold value, the actuation of the control device 6 is tested.

The operating unit 5 has a module for processing the control signals supplied by the control device 6. In the simplest version, mere receipt by the operating unit 5 of control signals supplied by the control device 6, irrespective of the type of signal, may be considered by the operating unit 5 to represent actuation of the control device 6. If the control device 6 is actuated then the control method returns to step S5 where the presence timer T2 is again reset. If the control device 6 is not actuated then the control method moves on to step S8 where the time elapsed within the time interval defined by the presence timer T2 since the timer T2 was set is compared against the total duration of the time interval of the timer. When this time elapsed is greater than the duration of the time interval defined by the timer, the presence timer T2 is considered to have timed out and the control method then returns to step S1. Otherwise, the control method returns to step S5 to reset the timer T2 again and potentially re-execute steps S6 and S7.

In summary, in this control method of FIG. 6, in the state in which the activation member 7 is not actuated and the presence timer T2 has started, when the absence of an operator is detected using the detection system 16 and the time elapsed since the timer T2 started is greater than the time interval defined by said timer T2, control using the control device 6 is prevented and a further actuation of the activation member 7 is required in order to be able to control at least the handling system 4 from the control device 6.

In step S4, the control method moves on, in parallel, to step S5 and to step S9 where a timer T1, referred to as the control timer, is started.

In step 10, the speed of the machine is compared against a threshold speed value stored in memory and generally equal to 1 km/h. If the speed is greater than the threshold speed, then the control method returns to step S9 to start the control timer T1 again, which corresponds to a resetting of the timer T1. The 10-second deadline therefore begins its count again. If the speed is below the threshold speed then the control method moves on to step S11 which tests for actuation of the control device 6 in a similar manner to step S7. If the control device 6 is actuated then the control method returns to step S9 where the control timer T1 is again reset. If the control device 6 is not actuated then the control method moves on to step S12 where the time elapsed within the time interval defined by the control timer T1 since the timer T1 was set is compared against the total duration of the time interval of the timer. When this time elapsed is greater than the duration of the time interval defined by the timer, the control timer T1 is considered to have timed out and the control method then returns to step S1. Otherwise, the control method returns to step S9 to reset the control timer T1 again and potentially re-execute steps S10 and S11.

Thus, in summary, in the state in which the activation member 7 is not actuated and the timer T1 has started, if the speed of travel of the machine is less than 1 km/h and if the control device 6 is not actuated within the time interval defined by the timer T1, then when the time interval T1 comes to an end, control using the control device 6 is prevented and a further actuation of the activation member 7 is required in order to be able to control at least the handling system 4 from the control device 6.

It should be noted that the time interval defined by the presence timer T2 is shorter than the time interval defined by the control timer T1.

Although the invention has been described in connection with a number of particular embodiments, it is quite obvious that it is not in any way restricted thereto and that it encompasses all technical equivalents of the means described and combinations thereof where these fall within the scope of the invention.

The use of the verb "have", "comprise", and "include" and of its conjugated forms does not exclude the presence of elements or steps other than those listed in a claim.

The invention claimed is:

1. A machine for handling loads, comprising:
   a chassis equipped with a driver station,
   a system for handling a load and borne by the chassis,
   a control device for controlling the load-handling system, this control device, which can be manually actuated by an operator, comprising a manual part configured to be grabbed manually,
   an operating unit, the operating unit being configured to receive control signals from said control device,
   an activation member for activating the manually actuatable control device, the operating unit being configured so as, in the actuated state of the activation member, to allow the handling system to be operated as a function at least of the control signals received from the control device, wherein the activation member is a first presence sensor on the manually activatable control device, distinct from the control device, and
   in that the operating unit is configured so that, when the activation member is in the non-actuated state after the activation member has passed from the actuated state to the non-actuated state, said operating unit preventing the load-handling system to be operated using the control device at least as a function of a status of the expiration of either one of a first presence timer or a second control timer,
   wherein the operating unit is configured to start said first presence timer defining a first time interval when the first presence sensor on the activation member passes from the actuated state to the non-actuated state that prevents the handling system from being operated using the control signals provided by the control device to the operating unit when the first time interval defined by the first presence timer has elapsed, wherein the operating unit is configured to reset the first presence timer as a function of at least the status, operator-absent or operator-present, detected by the separate second presence sensor that detects the presence of the operator at said driver station, and
   wherein the operating unit is further configured to start said second control timer, running in parallel to said first presence timer, said second control timer defining a second time interval when the activation member passes from the actuated state to the non-actuated state, and to prevent the handling system from being operated using the control device when the second time interval defined by the control timer has elapsed, the second time interval of the second control timer being resettable based on the machine moving above a predefined threshold speed value,
   wherein the second time interval defined by the second control timer is of a duration greater than the first time interval defined by the first presence timer.

2. The machine for handling loads according to claim 1, wherein the handling machine comprises a sensor sensing a parameter indicative of a movement of the machine, and in that the operating unit is configured to allow the handling system to be operated using the control device as a function of at least the parameter indicative of a movement of the machine.

3. The machine for handling loads according to claim 2, wherein the sensor of a parameter indicative of a movement of the machine is a sensor of a parameter indicative of the speed of travel of the machine, in that the machine comprises a memory for storing a predetermined speed of travel of the machine, and in that the operating unit is configured so that, when the activation member for activating the control device is in the non-actuated state, said operating unit allows the handling system to be operated using the control device when the speed of travel of the machine as supplied by the sensor of a parameter indicative of the speed of travel of the machine is greater than the predetermined value stored in memory.

4. The machine for handling loads according to claim 1, wherein the operating unit is configured to prevent a resetting of the first presence timer when the separate second presence sensor detects the absence of the operator.

5. The machine for handling loads according to claim 1, wherein the operating unit is configured to reset the first presence timer as a function at least of the control signals received from the control device.

6. The machine for handling loads according to claim 1, wherein the handling machine comprises a sensor sensing a parameter indicative of a movement of the machine, and in that the operating unit is configured to allow the handling system to be operated using the control device as a function of at least the parameter indicative of a movement of the machine, and
   wherein the operating unit is configured to reset the first presence timer as a function of the data provided by the sensor of a parameter indicative of a movement of the machine.

7. The machine for handling loads according to claim 1, wherein the operating unit is configured to reset the second control timer as a function of at least the data supplied by the sensor of a parameter indicative of a movement of the machine and, where appropriate, as a function of at least the control signals received from the control device.

8. The machine for handling loads according to claim 1, wherein the control device for controlling the handling system is a control device comprising at least two control elements.

9. The machine for handling loads according to claim 8, wherein the machine comprises a drive system driving the movement of the wheeled chassis, in that the control device for controlling the handling system is a multifunction control device, and in that at least one of the control elements is configured to control at least part of the handling system, and in that the other control element or another of the control elements is configured to control at least part of the drive system driving the movement of the machine.

10. The machine for handling loads according to claim 1, wherein the first presence sensor of the activation member is a sensor for detecting the presence of an operator's hand on the manual part of the control device.

11. The machine for handling loads according to claim 1, wherein the handling system comprises at least one handling arm mounted on said chassis rotatable about a horizontal axis of rotation and at least one actuator driving said handling arm in its movement about said horizontal axis of rotation.

12. The machine for handling loads according to claim 1, wherein the driver station takes the form of an operator cab inside which there is at least one seat on which the operator can sit, said operator cab being closed by a door, and in that the or at least one of the second presence sensor for detecting the presence of an operator at said driver station is in the seat.

13. The machine for handling loads according to claim 12, wherein the second presence sensor for detecting the presence of an operator at said driver station comprises at least a sensor for detecting the opening and/or the closing of the door.

14. A method for controlling a machine for handling loads the machine for handling loads having:
- a chassis equipped with a driver station,
- a system for handling a load and borne by the chassis,
- a control device for controlling the load-handling system, this control device, which can be manually actuated by an operator, comprising a manual part configured to be grabbed manually,
  - an operating unit, the operating unit being configured to receive control signals from said control device,
  - an activation member for activating the manually actuatable control device,
  - wherein said method comprising a step of:
  - manually actuating the activation member for activating the control device so as, in the actuated state of the activation member, to allow the handling system to be operated as a function at least of the control signals received from the control device, wherein the activation member is a first presence sensor on the manually activatable control device, distinct from the control device,
- the method comprises, when the activation member is in the non-actuated state after the activation member has passed from the actuated state to the non-actuated state, a step of the operating unit preventing the load-handling system to be or from being operated using the control device, at least as a function of a status of the expiration of either one of a first presence timer or a second control timer, and
- wherein the operating unit is configured to start said first presence timer defining a first time interval when the first presence sensor on the activation member passes from the actuated state to the non-actuated state, that prevents the handling system from being operated using the control signals provided by the control device to the operating unit when the first time interval defined by the first presence timer has elapsed, wherein the operating unit is configured to reset the first presence timer as a function of at least the status, operator-absent or operator-present, detected by the separate second presence sensor that detects the presence of the operator at said driver station, and
- wherein the operating unit is further configured to start said second control timer, running in parallel to said first presence timer, said second control timer defining a second time interval when the activation member passes from the actuated state to the non-actuated state, and to prevent the handling system from being operated using the control device when the second time interval defined by the control timer has elapsed, the second time interval of the second control timer being resettable based on the machine moving above a predefined threshold speed value
- wherein the second time interval defined by the second control timer is of a duration greater than the first time interval defined by the first presence timer.

* * * * *